United States Patent [19]

Thorpe

[11] 4,076,342
[45] Feb. 28, 1978

[54] BEARINGS

[75] Inventor: Ernest John Thorpe, Kenton, England

[73] Assignee: The Glacier Metal Company Limited, England

[21] Appl. No.: 654,970

[22] Filed: Feb. 4, 1976

[30] Foreign Application Priority Data

Feb. 5, 1975 United Kingdom ............... 4849/75

[51] Int. Cl.$^2$ ............................................. F16C 33/14
[52] U.S. Cl. .................................. 308/36; 308/237 R
[58] Field of Search .................... 308/36, 36.1, 38, 79, 308/80, 237 R, 237 A, 238; 29/149.5

[56] References Cited

U.S. PATENT DOCUMENTS

| 2,737,425 | 3/1956 | Fisher | 308/237 R |
| 3,713,714 | 1/1973 | Hill et al. | 308/237 |

Primary Examiner—Richard A. Bertsch
Attorney, Agent, or Firm—Burns, Doane, Swecker & Mathis

[57] ABSTRACT

This invention relates to plain bearings in which a part-cylindrical journal shell and an end flange are made separately and are then assembled together. Axial location is provided by engagement of the flange in a groove in the back of the shell.

11 Claims, 9 Drawing Figures

BEARINGS

This invention relates to plain bearings which comprise a part-cylindrical journal shell and a separate end flange at or near one, or each, axial end of the shell. Such a bearing can support journal loads on the shell and end loads on the flange and it is convenient if the shell and the flange can be made separately and then assembled together fairly easily, in such a manner that there is sufficient location between them to prevent disengagement or dislocation during assembly or use.

Each of the shell and the flange conveniently comprises a strong back possibly of steel, carrying a lining of a bearing material, for example, a softer metal or a plastics material. Such a lining can be of a self-lubricating material so that it is not necessary to provide a lubricating fluid during use or provision may be made for a fluid lubricant whether by providing sufficient reserve initially to last the life of the bearing or by providing for fresh supplies of lubricant continually or from time to time.

According to the invention, the separate end flange is engaged in a recess in the back of the shell at or near the end and is located circumferentially by co-operating shoulders on at least one notch in the shell and at least one lug on the flange.

The side wall of the recess acts to locate the flange in relation to the shell axially, and if axial location is required in both senses, the recess can be constituted by a groove in the back of the shell having two axially-separated side walls. In any case, the lug or lugs, which preferably extend radially inwardly from the flange, provide circumferential location so that the flange can be completely located in relation to the shell.

With a thin shell it would be possible to assemble the flange and shell by flexing the shell radially inwardly and allowing it to spring back with the recess or groove embracing the radially inner edge of the flange, but where it is not convenient to flex the shell it is possible either to have the, or each, lug deformed out of the plane of the flange while the flange is assembled in the groove and then to deform the, or each, lug back into the circumferential location position, or to assemble the shell and flange with the inner edge of the flange just outside the groove and then deform the inner edge of the flange at local parts which are forced into the groove. The local parts are conveniently at lubricant grooves where the material is thinner than at the rest of the flange.

The invention may be carried into practice in various ways and several embodiments will be described by way of example, with reference to the accompanying drawings, in which.

Figure 1:
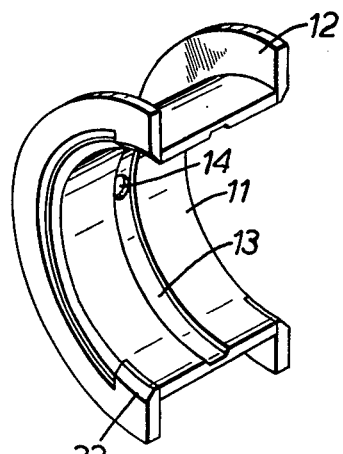
FIG. 1 is a general arrangement in perspective view of one embodiment of the invention.
Figure 2:
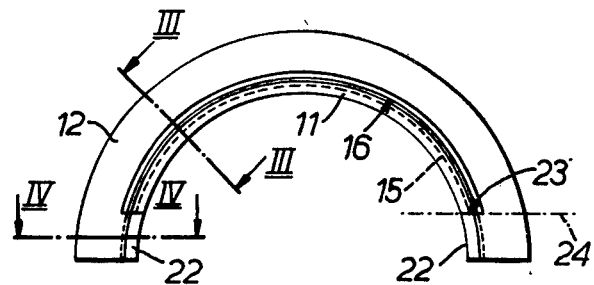
FIG. 2 is an end view of the bearing of FIG. 1.

The bearing of FIG. 1 comprises a semicylindrical shell 11 and a pair of flat semi-annular flanges 12, one at each end of the shell 11. Each component comprises a steel backing with a lining of a low friction bearing material. There is an annular lubricant groove 13 extending around the centre of the shell 11 arranged to be supplied with lubricant through a radial passage 14.

Figure 3:
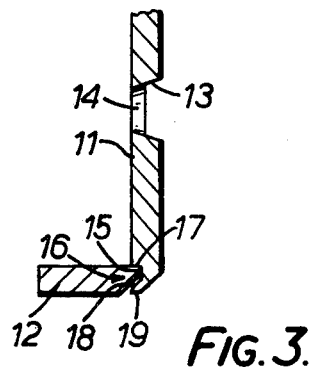
FIGS. 3 and 4 are respectively sections on the lines 111—111 and IV—IV in FIG. 2 to an increased scale.
Figure 4:
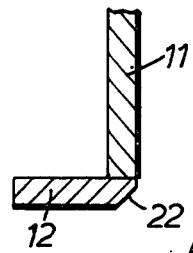

At each end the flange 12 is engaged in a groove 15 in the back of the shell 11, and assembly is achieved by squeezing the ends of the shell 11 inwardly until the shell can fit within the inner edge 16 of the flange after which the shell is allowed to spring back to leave the flange engaged and radially located in the groove as shown in FIG. 3. FIG. 3 shows the face 17 of the backing of the flange 16 located axially against one wall of the groove 15 and it would also be possible to provide location against the axially outer wall 18 in application where that was necessary. In the examples being described, both the outer edge of the shell 11 at 19 and the inner edge of the flange 16 taper as shown in FIG. 3. The inner edge of the flange 16 locates in the bottom of the groove 15. Circumferential location is provided by a pair of radially-inwardly-extending lugs 22 one at each circumferential end of the flange 12 defining a shoulder 23 at a chordal line 24. The shell 11 is cut away in a notch to provide a corresponding engagement shoulder and it will be appreciated that when the lining is deformed to allow the flange to engage in the groove the deformation must be sufficient to clear the inner edges of the lugs 22; when the shell is sprung back into its normal position the shoulders engage at 23 and complete the location axially, radially and circumferentially.

Figure 5:
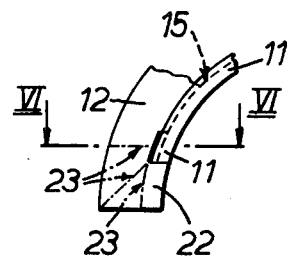
FIG. 5 is a view corresponding to FIG. 2 of a modified bearing.

If it is not convenient to deform the shell 11 — possibly because it is too thick in relation to its diameter — then the lugs 22 can be arranged to be bent — possible about any of the three axes 23 shown in FIG. 5 — and possibly after machining away part of the flange to make the bend an easy one to effect. The lug then does not prevent the flange being engaged in the groove by a radially inward movement as shown by the arrow 24 in FIG. 6 and then the lug 22 can be simply bent back into the plane of the flange as shown by the arrow 25 until the shoulders engage at 23.

Figure 6:
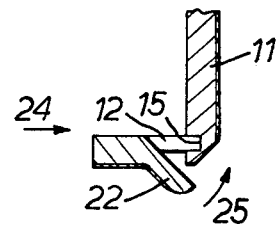
FIG. 6 is a section on the line VI—VI in FIG. 5 to an increased scale.

In an alternative method of assembling the bearing of FIGS. 5 and 6 only one of the lugs 22 is bent out of the normal plane of the flange. The flange at that lug is inserted into the groove with a circumferential movement at the point 180° opposite that at which it will end up and then the flange is run round the groove through 180° after which the lug is bent back into the plane of the flange to provide circumferential location.

Figure 7:
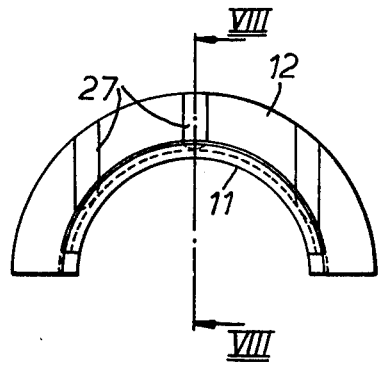
FIG. 7 is a view corresponding to FIG. 5 of a further modification.
Figure 8:
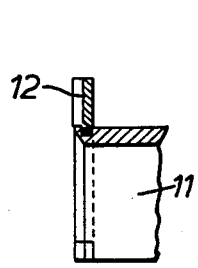
FIG. 8 is a section on the line VIII—VIII in FIG. 7.
Figure 9:
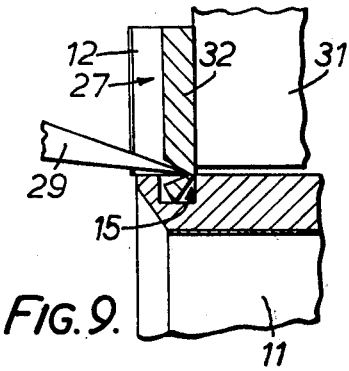
FIG. 9 is a detail of FIG. 8 to an increased scale.

For the modification shown in FIGS. 7, 8 and 9 which is particularly suitable where the flange is formed with a number of lubricant grooves 27, the greater part of the inner circumferential edge of the flange does not enter the groove 15 but is of the same radius as the back wall of the shell 11. Once they are precisely positioned in relation to each other, the portions of the inner edge of the flange at the lubricant grooves 27 are locally distorted and forced into the groove by use of a chisel 29 being struck axially against an anvil 31 as can be seen best from FIG. 9. FIG. 9 shows that the material 32 remaining after cutting of the grooves 27 is thinner than the full thickness of the flange so that deformation is quite simple and does not result in deformation of the flange. In fact the metal could be tapered at 32. It will be appreciated that in the modification of FIGS. 7 to 9, initial assembly is by a simple axial movement because the radius of the inner edge of the flange is not less than the back of the shell and the shoulders 23 on the lugs 22 do not require bending and can be simply slid axially into position.

What we claim as our invention and desire to secure by Letters Patent is:

1. A self-supporting half-cylindrical plain bearing comprising a part-cylindrical journal shell and a separate part-annular end flange located radially and axially in relation to the shell by engagement in an annular recess in the back of the shell at one end and located circumferentially by co-operating shoulders on at least one notch in the shell and at least one lug on the flange, the edge of said flange being located in said recess.

2. A bearing as claimed in claim 1 in which the recess comprises a groove having axially separated sides.

3. A bearing as claimed in claim 1 in which the whole length of the radially inner edge of the flange other than the portion at the lug or lugs lies in the groove.

4. A bearing as claimed in claim 1 in which local parts only of the inner circumferential edge of the flange lie in the groove.

5. A bearing as claimed in claim 4 in which the local parts have been deformed into the groove after assembly of the flange with the shell.

6. A bearing as claimed in claim 1 including one lug at each circumferential end of the flange and a corresponding notch in the shell for each lug.

7. A bearing as claimed in claim 1 in which each lug extends radially inwardly from the flange.

8. A bearing as claimed in claim 7 in which the lug has been deformed after assembly of the flange in the shell into the circumferential location position.

9. A bearing as claimed in claim 1 in which the said end of the shell tapers axially outwards.

10. A bearing as claimed in claim 1 in which the inner edge of the flange tapers radially inwards.

11. A bearing as claimed in claim 1 including a second similar flange at the other end of the shell.

* * * * *